Dec. 7, 1954   G. R. MARKOW ET AL   2,696,604
SUPERVISORY SYSTEM
Filed Aug. 2, 1952   2 Sheets-Sheet 1

INVENTORS
AND GEORGE R. MARKOW
ANTHONY J. HORNFECK
BY
*Raymond W. Jenkins*
ATTORNEY Dec. 7, 1954  G. R. MARKOW ET AL  2,696,604
SUPERVISORY SYSTEM
Filed Aug. 2, 1952  2 Sheets-Sheet 2

INVENTORS
GEORGE R. MARKOW
AND ANTHONY J. HORNFECK
BY Raymond D. Junkins
ATTORNEY

United States Patent Office 2,696,604
Patented Dec. 7, 1954

2,696,604

SUPERVISORY SYSTEM

George R. Markow, Cleveland Heights, and Anthony J. Hornfeck, South Euclid, Ohio, assignors to Bailey Meter Company, a corporation of Delaware Application August 2, 1952, Serial No. 302,436

10 Claims. (Cl. 340—213)

This invention relates to the scanning of a plurality of variables wherein the condition of the variables may be indicated continuously and if the condition of the variables does not remain within a certain pre-selected range of values an alarm is actuated. Scanning instruments are common in the art, and are used to scan a variety of variables such as temperature, pressure, salinity, strain, etc.

A particular embodiment of our invention is shown wherein the variable being scanned is temperature. A plurality of temperature responsive resistance elements are automatically and successively scanned in such manner as to indicate the temperature at each element, while, at the same time, an electrical circuit allows the potential across each element to be compared in potential comparison circuits with a potential representing a pre-selected maximum and minimum temperature setting, and if the temperature is either above or below the selected temperature range, an alarm is given.

An object of this invention is to obtain accurate temperature measurements during the condition responsive resistance element scanning operation. Our invention shows structure for connecting the temperature responsive resistance element to potential comparison circuits so that the accuracy of temperature measurement and speed of scanning are both obtainable.

In scanning a plurality of variables, it is often found that the temperature responsive resistance elements are located at varying distances from the scanning instrument. In such case, it is necessary to compensate for the lead resistance of the elements so that the temperature measurements will not be affected thereby. Additionally, temperature measurements are also affected ordinarily by any contact resistance of switches in the measuring circuits. This invention solves the problem of line resistance and contact resistance effect by providing a circuit wherein there is no current flow in the potential comparison circuit.

Further, the circuit is so arranged that each responsive element to be scanned is connected so that it may sound either a high or low alarm if a predetermined range is exceeded, and that each particular element can be set so that an alarm can be sounded at different high and low alarm points or, if it is desired, all the elements can be compared with a single temperature setting.

Our invention represents an improvement over existing temperature scanners particularly in the accuracy of the temperature indication and in the simplicity of the electrical circuitry. These features will be pointed out in the description of the invention below.

Figure 1:
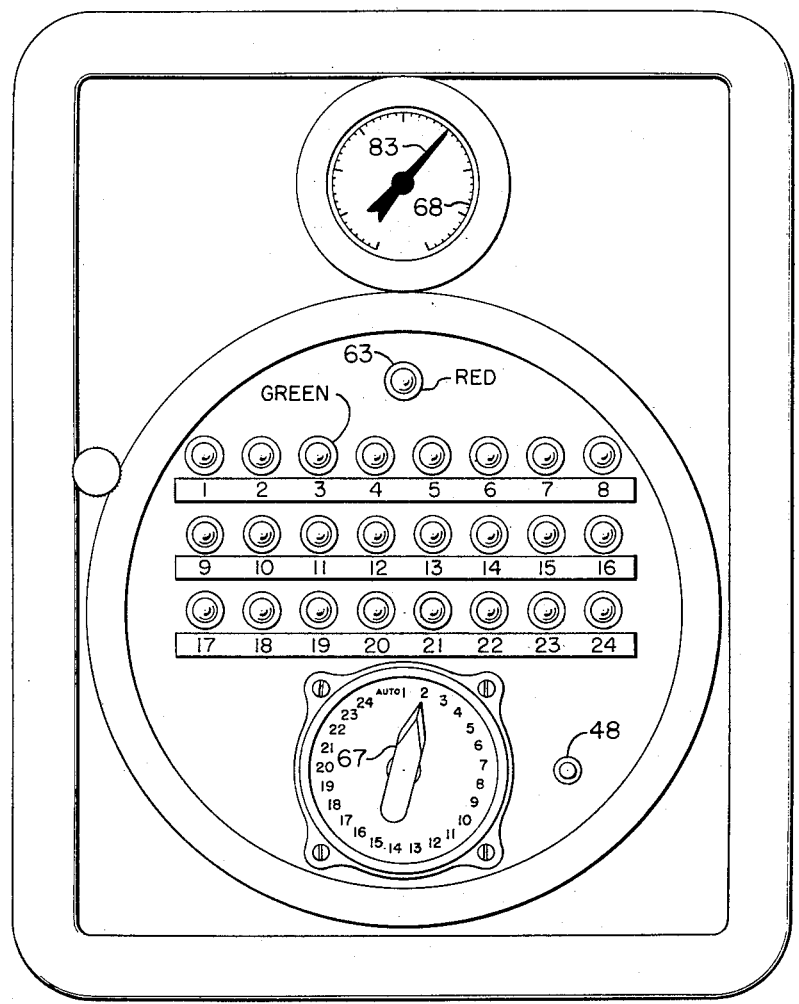
Fig. 1 represents a front view of the temperature scanning instrument showing an alarm light and indicating lights representing the various temperature elements.

The general operation of our scanner can be explained with reference to Fig. 1. Numerals 1-24 refer to the number (arbitrarily chosen) of temperature responsive resistance elements to be scanned either automatically or manually. The lights above the numbers 1-24 are lighted individually and successively as the temperature elements are scanned. Manually operated selector switch 67 may be placed either on the pointed marked "Automatic" or on a number representing a particular temperature element. During the scanning operation there is a continuous successive lighting of green lights 1-24 as the scanning operation (described in reference to Fig. 2) proceeds from one temperature element to the next, either automatically or by the manual operation of switch 48, as will be explained later. At the same time, the temperature corresponding to the particular element being scanned can be read by the position of temperature indicator pointer 83 on scale 68 if switch 67 is placed in the automatic position. If an over or under temperature occurs, the scanning operation stops, red light 63 is lighted, the green light at the element giving the over or under temperature remains lighted, and the temperature is indicated on scale 68. As shown on Fig. 2 provision may be made for including a red light 63 for the high temperature alarm and a yellow light 63A for the low temperature alarm.

To continue the scanning operation after the alarm, the operator closes switch 48 momentarily, and the scanner then moves automatically over the temperature element contacts 1-24. If the element which sounded the alarm has not yet returned to within the normal temperature range, the scanning operation will again stop for the same over or under temperature condition that previously stopped the scanner.

If the operator is desirous of checking the temperature of any temperature element during scanning, or the particular element which interrupted the scanning, he need only turn switch 67 to the proper number and that temperature will be continuously indicated on scale 68. The green lights will continue to indicate the elements as they are being scanned.

Additionally, if it is desired to scan the temperature responsive resistance elements more rapidly than the speed of the scanner (which is here chosen to be one element for every two seconds) the operator can push switch 48 rapidly and as the switch is pushed the scanner will move from point to point at the same speed as that which the switch is being actuated. The circuitry including switch 48 will be described below.

Figure 2:
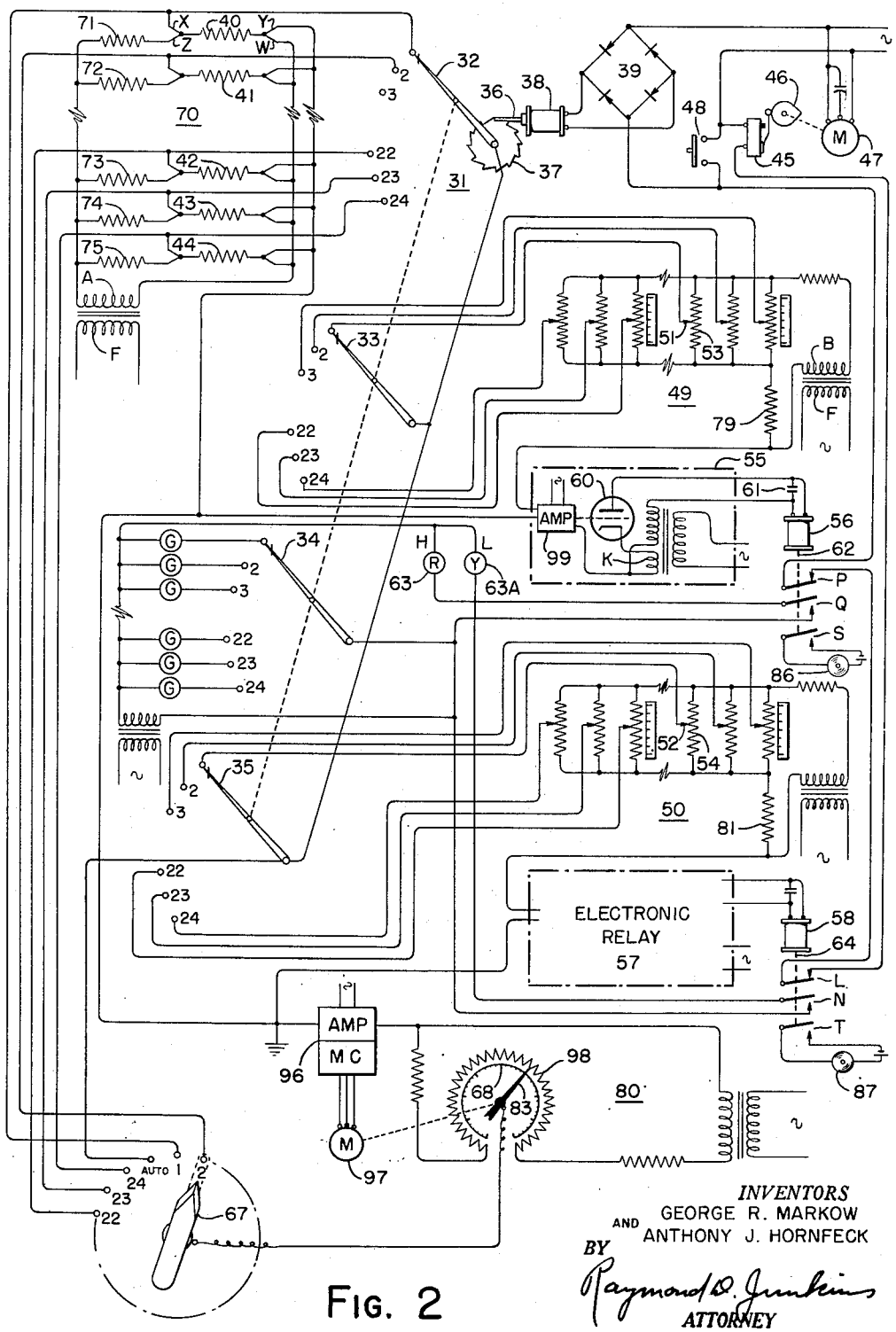
Fig. 2 is a schematic circuit diagram of the temperature scanner instrument.

Referring to Fig. 2, an automatic selector switch 31 is shown with contact arms 32–35 which are rotated simultaneously by the action of ratchet wheel 37. The ratchet wheel 37 is rotated by the action of core 36 of relay coil 38. Relay coil 38 is energized by direct current from the full wave rectifier circuit 39 which is connected across an alternating current source. There is provided in one lead of the source a switch 45 and switches P and L which are normally closed. Switch 45 is alternately opened and closed by the rotation of shaped cam 46, which is turned continuously by motor 47. Cam 46 as shown has one nib on its periphery and it is this shape that determines the speed of the selector switch 31. It can be seen that by adding another nib opposite the one shown on cam 46 that the speed of the scanning could be doubled, without changing the speed of motor 47.

When switch 45 is closed the alternating current is allowed to pass through full wave rectifier 39 which in turn produces a direct current to energize relay coil 38 and draw core 36 into the coil so that it is then in place with the next step on ratchet wheel 37. As the cam 46 rotates so that switch 45 is open, rectifier circuit 39 is deenergized which deenergizes coil 38 and a spring (not shown) within coil 38 pushes the core 36 against a step of ratchet wheel 37 thus moving selector switch contact arms 32–35 to the next resistance element contact point 1-24. The function of switches P and L in the switch circuit will be described below.

As each temperature responsive resistance element contact is contacted by the arm 32 through operation of selector switch 31, the corresponding temperature responsive element is connected into potential comparison circuit 49, and similarly arm 35 places the same resistance element simultaneously into potential comparison circuit 50. If the manual selector switch 67 is placed on the point marked "Automatic" the temperature responsive resistance elements being contacted by selector switch arm 32 are also placed in the temperature indicating circuit 80 so that the temperature at the particular element can be simultaneously indicated upon scale 68.

Referring now to the elements of potential comparison circuits 49 and 50, each of the taps 51, 52 on slidewires 53, 54 are individually manually adjustable in accordance with the desired temperatures that the temperature elements 40–44 are to be compared with. Only one tap and one slidewire in each potential comparison circuit is numbered as the others are identical in operation, and in actuality there are twenty-four slidewires in circuit 49, and a similar number in circuit 50, but, for obvious reasons, only a few are shown on Fig. 2. Similarly, we show, by way of example, only five resistance elements 40–44 although there might be 24 or more. The setting of the manual taps in circuit 49 provides for the maximum temperature setting and the taps in potential comparison circuit 50 provide for the minimum temperature setting. When the temperature of a resistance element is between these maximum and minimum preset values it is considered to be operating within a normal operating range. Circuit 49 provides, through the operation of electronic relay 55, the actuation of relay coil 56 so that an alarm can be sounded and the scanning operation stopped when the potential across the temperature responsive resistance element is greater than that set on slidewire 53, by manually adjustable tap 51 (for example). The same provisions are made in circuit 50 through the action of electronic relay 57 in conjunction with relay coil 58, except, that this circuit, provides for the alarm and stopping of the scanning operation in accordance with a low temperature indication across one of the temperature elements.

The particular circuitry for connecting the temperature responsive elements is shown at 70. Resistances 71–75 (only five of the twenty-four resistances are shown) are fixed resistances and are all of the same value—in this case 500 ohms. Resistance elements 40–44 (only five of twenty-four resistance elements are shown) are temperature responsive and are the primary elements of the temperature scanner. The potential for circuit 70 is supplied by a transformer F. The elements 40–44 have four-wire connections, two of the connections X, Y are potential connections and two Z, W are current connections. This allows the potential across the elements 40–44 to be connected in circuits 49, 50 and 80 through the use of potential leads X, Y and selector switch 31 without having the effect of line resistance, there being no current flow in X, Y thus effectuating a more accurate temperature measurement as the line resistance and the contact resistance of arm 32 against taps 1–24 creates no effect in the circuits. Current leads Z, W are connected to the secondary A of transformer F. By utilizing two potential sources such as secondary windings A and B of the transformer F, it is possible to utilize the idea of separating the potential leads and the current leads of the temperature elements.

The various resistance elements 40–44 have their potential leads X, Y connected to the potential comparison circuits 49, 50 through the operation of arms 32, 33, 35 of selector switch 31. Circuits 49, 50 include identical electronic relays 55 and 57 and only circuit 49 need be explained as it is identical to potential comparison circuit 50, with the exception that the alternating current entering electronic relay 57 is of opposite phase of the A.-C. entering relay 55. The operation of circuit 49 is as follows: the potential across the particular resistance element being scanned, for example, resistance element 40, is compared with the potential existing across a fixed resistor and a variable resistor (for element 40 this would be resistor 79 and variable resistor 53 with tap 51). The potential difference is the input to amplifier 99. Such amplifier is well known in the art and is described in Ryder Patents 2,275,317 and 2,333,393. The output of the amplifier 99 is applied to the grid circuit of triode 60 and the anode of tube 60 is connected to relay coil 56. When the elements 40–44 are operating within the pre-set minimum and maximum temperatures, there is sufficient plate current from tube 60 to keep the coil 56 energized. When, for example, the resistance of element 40 is increased by an increase in temperature of the condition being measured to a point where the potential across the resistance element is equal to that across resistor 79 and resistor 53 and tap 51, then the potential comparison circuit is in balance and the input to the amplifier 99 is zero. It is at this balance point that relay coil 56 must be deenergized so that core 62 can actuate switches P, Q and S, to sound the alarm and stop the scanning operation. Under this balance condition, the output of amplifier 99 is also at zero, and, ordinarily, there would be a zero potential at the grid of tube 60 which would allow plate current to flow and to keep relay coil 56 energized. This, however, is not desirable, for it is necessary to deenergize relay coil 56 to sound the alarm and stop the scanning operation when the potential comparison circuit 49 is at balance for then the temperature responsive resistance element has increased its potential to equal that across the manually set resistance 53 and fixed resistance 79.

In order that the relay coil 56 becomes deenergized when the amplifier 99 input is zero it is seen that secondary winding K of transformer F is placed in the cathode circuit of triode 60. The transformer provides sufficient bias voltage to cut off the tube 60 when there is no output from the amplifier 99. Thus the plate current is cut off and coil 56 is deenergized. This actuates core 62 to open switch P which stops the scanning operation and at the same time switches Q and S are closed allowing alarm light 63 to light and audible alarm 86 to sound. Capacitor 61 is provided to prevent chattering of the relay coil 56 and core 62, for in the half-cycle when the plate of tube 60 is negative there would be no current to the coil 56 and it would tend to deenergize continuously were it not for the capacitance of 61 which is built up in the half-cycle of the plate of tube 60 as positive. Thus we have provided a potential comparison circuit operating in conjunction with an electronic relay, which, when the resistance elements 40–44 are in the standard operating range allows the relay coil 56 to remain energized. But upon the potential across the element 40–44 increasing to that of the potential established in the potential comparison circuit 49, the potential difference causes the shift in phase to the input of amplifier 99, and electronic relay 55 causes relay coil 56 to be deenergized thus stopping the scanning and sounding the high alarm 86.

The same action takes place in potential comparison circuit 50, except that circuit 50 deenergizes coil 58, when the potential across the resistance element being scanned balances the potential across resistor 81 and resistor 54 with manually adjustable tap 52. The taps in circuit 50 represent the low temperature alarm set points, and when coil 58 is deenergized, core 64 actuates to open switch L which stops the current flow to rectifier 39 thus stopping the scanning operation. At the same time switch L opens and switches N and T close to light a yellow low alarm light 63A, and sound low alarm 87.

Additionally, the bias action of winding K also operates as a fail-safe device, for if a tube of amplifier 99 should fail, the output of the amplifier would also drop to zero and the bias transformer K would then operate to cut off the plate current of tube 60 thus deenergizing the coil 56 which would stop the scanning operation and sound the alarm.

Circuit 80 is the temperature indicating circuit, and the various temperature elements 40–44 are connected to circuit 80 through contact arm 32 and switch 67. The amount of heat at the element varies the potential across the resistance element being scanned and causes a potential unbalance in circuit 80 which is detected by amplifier and motor control circuit 96 as is described in the Ryder patents. The unbalance voltage causes motor 97 to move tap 83 along resistor 98 until potential balance is restored. When the circuit 80 is balanced motor 97 is at rest and the temperature is read on scale 68. Switch 67 allows the resistance element potentials to be placed successively in circuit 80 automatically, or an individual element can be checked continuously depending upon the setting of switch 67.

Using circuit 70 in conjunction with circuits 49 and 50 allows the use of a lesser number of resistances to obtain a potential comparison through those circuits. No Wheatstone bridge circuit is necessary as the amount of potential change resulting from a temperature change at the temperature element is compared with the potential established by manual adjustment in potential circuits 49 and 50. The manually adjustable taps mentioned represent the pre-set alarm points which may be changed from time to time manually.

Thus it can be seen that our invention provides for a supervisory type of instrument which scans a plurality of variables and successively compares each temperature responsive resistance element with a manually pre-selected potential for both a high temperature value and a low temperature value. As long as the temperature element is operating within the high and low limits the automatic scanning operation continues. As each temperature element is being compared simultaneously in both the high and low potential comparison circuits then a deviation beyond either the minimum or maximum by the temperature element will immediately cause either the high or the low alarm to sound and the scanning operation to cease. A principal feature of our invention lies in separating the current and potential leads of the various temperature responsive resistance elements thus providing a potential comparison circuit which has no current flow and consequently line resistance and switch contact resistance have little effect on the accuracy of the temperature indication. Our invention provides for simultaneous scanning for high limit, for low limit, and for actual temperature at the scanned element. Additionally each temperature element can be set to give an alarm at a selected one of numerous high temperature limits and a selected one of numerous low temperature limits.

It will be understood that switch 31, having arms 32, 33, 34 and 35 is arranged to rotate by way of the ratchet wheel 37 a full 360° although Fig. 2, for simplicity, shows only a few of the contact points. The total of twenty-four contact points (other chosen number) would be arranged for free rotation of the contact arms so that when the arms leave the contact No. 24 they next engage the contact No. 1.

It will be appreciated, that while we have shown the various resistance elements as energized with A.-C. it is quite possible to utilize our invention in connection with resistance elements energized with D.-C. In certain instances this may be necessary to avoid A.-C. pickup. To utilize D.-C. it is only necessary to furnish a D.-C. source of energy at the element and a D.-C. source for the potential comparison circuit. Additionally a D.-C. to A.-C. converter would be placed in the input of amplifier 99.

While we have chosen to illustrate and describe this preferred embodiment of our invention, it will be understood that this is by way of illustration only, and is not to be considered as limiting.

What we claim as new, and desire to secure by Letters Patent of the United States is:

1. An instrument for scanning a plurality of condition responsive resistance elements, each said element having a pair of potential leads, a potential comparison circuit including a manually adjustable comparison resistance and an electronic relay, a potential balance circuit for indicating the value of the condition, a source of electrical energy for the system, an automatic selector switch arranged to connect the pair of potential leads of each condition responsive resistance element successively to the said potential comparison circuit and simultaneously connecting said potential leads into the said potential balance circuit, and an alarm circuit, the selector switch in its successive operation placing the potential of one of said condition responsive resistance elements across the said potential comparison circuit whereupon said electronic relay actuates to energize said alarm circuit should the condition reach a predetermined value while simultaneously indicating the condition value by the actuation of the potential balance circuit.

2. An instrument for scanning a plurality of condition responsive resistance elements, each said element having a pair of potential leads and a pair of current leads, a source of electrical energy for said current leads, a potential comparison circuit including a manually adjustable comparison resistance and an electronic relay, a separate source of electrical energy for said potential comparison circuit, a potential balance circuit for indicating the value of the condition, an automatic selector switch arranged to connect the pair of potential leads of each condition responsive resistance element successively to the said potential comparison circuit and simultaneously connecting said potential leads into the said potential balance circuit, and an alarm circuit, the selector switch in its successive operation placing the potential of one of said condition responsive resistance elements across the said potential comparison circuit whereupon said electronic relay actuates to energize said alarm circuit should the condition reach a predetermined value while simultaneously indicating the condition value by the actuation of the potential balance circuit.

3. The combination of claim 2 including a second potential comparison circuit including a second manually adjustable resistance and a second electronic relay, a second alarm circuit, the selector switch in its successive operation placing the potential of one of the said condition responsive resistance elements across the first potential comparison circuit whereupon said electronic relay actuates to energize the first alarm circuit should the condition reach a predetermined maximum value, while simultaneously the said potential across said element is placed across said second potential comparison circuit by the said selector switch whereupon said second electronic relay actuates to energize the second alarm circuit should the condition reach a predetermined minimum value.

4. In an electric alarm system for supervising a plurality of variable conditions, a plurality of condition responsive resistance elements each having a pair of potential leads and a pair of current leads, a source of current for said current leads, a plurality of potential comparison circuits each including a plurality of manually adjustable comparison resistances and each including an electronic relay, a separate source of current for said potential circuits, an automatic selector switch to connect the pair of potential leads of each condition responsive element successively and simultaneously to each of the said plurality of potential comparison circuits, and an alarm circuit for each of the plurality of potential comparison circuits, the selector switch in its successive operation placing the potential of one of the said condition responsive resistance elements across the potential comparison circuits whereupon said electronic relay of one of the plurality of potential comparison circuits actuates to energize one of said alarm circuits should the condition reach a predetermined value as set on the manually adjustable resistances.

5. An instrument for supervising a plurality of condition responsive resistance elements, each resistance element having a pair of potential leads and a pair of current leads, a source of electrical energy for said current leads, a potential comparison circuit including a manually adjustable comparison resistance and an electronic relay, a separate source of electrical energy for said potential comparison circuit, a potential balance circuit for indicating the value of the condition, a selector switch arranged to connect the pair of potential leads of each condition responsive resistance element successively to the said comparison circuit while simultaneously connecting said potential leads into said potential balance circuit, a manually operated switch to energize and deenergize said selector switch, and an alarm circuit, the selector switch in its actuation by operation of said manual switch placing the potential leads of one of the said condition responsive resistance elements across the said potential comparison circuit whereupon the said electronic relay actuates to energize said alarm circuit should the condition reach a predetermined value while simultaneously indicating the condition value by the actuation of the potential balance circuit.

6. A system for comparing the potential across a condition responsive resistance element with predetermined values representing the selected maximum and minimum value of the condition, including a plurality of said elements each one having a pair of potential leads and a pair of current leads, a source of electrical energy for said current leads; a potential comparison circuit including an adjustable resistance element set for the predetermined maximum value of the condition, and an electronic relay; a second potential comparison circuit including an adjustable resistance element set for the predetermined minimum value of the condition, and a second electronic relay of opposite phase of the first electronic relay; a separate source of electrical energy for said potential comparison circuits, an automatic selector switch arranged to connect the pair of potential leads of each condition responsive resistance element successively to the said potential comparison circuits, and an alarm circuit, the selector switch in its successive operation placing the potential of one of the said condition responsive resistance elements across the said potential comparison circuits whereupon one of said electronic relays actuates to energize said alarm circuit should the condition reach either of the predetermined maximum and minimum values.

7. The system of claim 6 including a potential balance circuit for simultaneously indicating the value of the condition when the potential leads of said elements are simultaneously placed across said potential balance circuit by said selector switch.

8. In an electric alarm system supervising a plurality of variable conditions, a plurality of resistance elements each having separate current and potential leads and responsive each to one of a plurality of variable conditions, a plurality of fixed resistances each arranged to be placed in series with one of the plurality of condition responsive resistance elements, a source of electrical energy for said fixed resistances and said condition responsive resistance elements, a potential comparison circuit including said potential leads of said resistance elements and adjustable resistance in series with a fixed resistance across a second source of electrical energy, an electronic relay operative when the potential across the condition responsive element is equal to the potential existing across said adjustable resistance and fixed resistance in series therewith, and an alarm circuit means operative by said electronic relay to open circuit means in a third source of electrical energy, said third source of electrical energy operative to actuate said selector switch means, said selector switch means operative to connect said potential leads of each condition responsive resistance element successively into said potential comparison circuit.

9. In an electric alarm system for supervising a plurality of variable conditions, a plurality of condition responsive resistance elements each having a pair of potential leads and a pair of current leads, a first potential comparison circuit including selector switch means for connecting the potential leads of said condition responsive resistance elements, an alarm circuit, an electronic relay operative upon a condition of the first potential comparison circuit to energize the alarm circuit at a maximum value of the condition, a second potential comparison circuit including said selector switch means for connecting the said potential leads of said condition responsive resistance elements simultaneously and second electronic relay means operative upon a minimum value of the condition to energize the alarm at a minimum value of the condition, and measuring circuit means including said selector switch means for connecting said potential leads of said condition responsive elements so that the value of the condition is continuously indicated.

10. A potential comparison circuit including a four-wire condition responsive resistance element and a fixed resistance element shunted across a first source of potential, an alarm circuit, a manually adjustable resistance element and a second fixed resistance element shunted across a second source of potential, and an electronic relay means responsive to the potential existing across the condition responsive resistance element established by the first source of potential and the adjustable potential existing across the second source of potential, said electronic relay actuated upon potential balance in the said potential circuit to energize said alarm circuit.

References Cited in the file of this patent

UNITED STATES PATENTS

| Number | Name | Date |
|---|---|---|
| 2,564,294 | Belcher, Jr. | Aug. 14, 1951 |
| 2,573,175 | Bergen et al. | Oct. 30, 1951 |
| 2,578,447 | Odell et al. | Dec. 11, 1951 |

FOREIGN PATENTS

| Number | Country | Date |
|---|---|---|
| 502,711 | Great Britain | Mar. 23, 1939 |